(12) United States Patent
Tsirkin (10) Patent No.: US 12,423,132 B2
(45) Date of Patent: Sep. 23, 2025

(54) EFFICIENT QUEUE SHADOWING FOR VIRTUAL MACHINES

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 465 days.

(21) Appl. No.: 18/146,027

(22) Filed: Dec. 23, 2022

(65) Prior Publication Data
US 2024/0211293 A1 Jun. 27, 2024

(51) Int. Cl.
*G06F 9/455* (2018.01)

(52) U.S. Cl.
CPC ...... *G06F 9/45558* (2013.01); *G06F 9/45545* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 7,299,337 B2* | 11/2007 | Traut | ............... | G06F 12/1036 |
| | | | | 711/E12.068 |
| 7,395,405 B2* | 7/2008 | Anderson | ........... | G06F 9/45558 |
| | | | | 718/1 |
| 7,613,898 B2* | 11/2009 | Haertel | ............... | G06F 9/45558 |
| | | | | 711/206 |
| 7,882,330 B2* | 2/2011 | Haertel | ............... | G06F 9/45558 |
| | | | | 711/206 |
| 8,060,722 B2* | 11/2011 | Adams | ............... | G06F 12/1036 |
| | | | | 711/E12.008 |
| 8,086,821 B2* | 12/2011 | Mukherjee | .......... | G06F 12/1081 |
| | | | | 711/203 |
| 8,386,745 B2 | 2/2013 | Kegel et al. | | |
| 8,631,212 B2 | 1/2014 | Kegel et al. | | |
| 8,843,669 B2* | 9/2014 | Pavlov | ............... | G06F 13/28 |
| | | | | 718/1 |
| 9,535,849 B2 | 1/2017 | Kegel et al. | | |
| 9,639,388 B2* | 5/2017 | Tsirkin | ............... | G06F 9/45558 |

(Continued)

OTHER PUBLICATIONS

Huang et al., "Building a KVM-based Hypervisor for a Heterogeneous System Architecture Compliant System," Department of Computer Science, National Chiao Tung University, Taiwan, Apr. 2016, 15 pages, http://www.cs.nthu.edu.tw/~ychung/conference/2016_VEE.pdf.

*Primary Examiner* — Van H Nguyen
(74) *Attorney, Agent, or Firm* — Dority & Manning, P.A.

(57) ABSTRACT

Systems and methods for efficient peripheral device software request queue shadowing for virtual machines can include creating a virtual machine and assigning a peripheral device to it. They can also include assigning, to the peripheral device, a first process address space identifier (PASID) associated with a shadow memory buffer and a second PASID associated with a device data buffer. They can further include causing a host input/output memory management unit (IOMMU) to identify a software request in the shadow memory buffer, and fetching, from the shadow memory buffer, the software request and a guest memory address of data requested to be accessed. They can also include, causing the host IOMMU to identify the data in the device data buffer, and transmitting the data, from the guest memory, to the peripheral device.

20 Claims, 6 Drawing Sheets

(56) References Cited

U.S. PATENT DOCUMENTS

| | | |
|---|---|---|
| 10,048,881 B2 | 8/2018 | Sankaran et al. |
| 10,853,118 B2 * | 12/2020 | Tian .................... G06F 9/45558 |
| 11,360,914 B2 | 6/2022 | Cooray et al. |
| 2019/0361728 A1 | 11/2019 | Kumar et al. |
| 2021/0173790 A1 | 6/2021 | Kakaiya et al. |

* cited by examiner

```
┌─────────────────────────────────────────────────────────────────────────┐
│ RECEIVING A FIRST PROCESS ADDRESS SPACE IDENTIFIER (PASID) ASSOCIATED   │
│ WITH A SHADOW MEMORY BUFFER IN A HOST MEMORY 402                        │
└─────────────────────────────────────────────────────────────────────────┘
                                    ↓
┌─────────────────────────────────────────────────────────────────────────┐
│ RECEIVING A SECOND PASID ASSOCIATED WITH A DEVICE DATA BUFFER IN A GUEST│
│ MEMORY 404                                                              │
└─────────────────────────────────────────────────────────────────────────┘
                                    ↓
┌─────────────────────────────────────────────────────────────────────────┐
│ TRANSMITTING, TO A HOST INPUT/OUTPUT MEMORY MANAGEMENT UNIT (IOMMU), A  │
│ REQUEST COMPRISING THE FIRST PASID TO IDENTIFY A SOFTWARE REQUEST IN THE│
│ SHADOW MEMORY BUFFER USING THE FIRST PASID AND A FIRST CORRESPONDING    │
│ PAGE TABLE ENTRY                                                        │
│ 406                                                                     │
└─────────────────────────────────────────────────────────────────────────┘
                                    ↓
┌─────────────────────────────────────────────────────────────────────────┐
│ RETRIEVING, FROM THE SHADOW MEMORY BUFFER OF THE HOST MEMORY            │
│ LOCATION, THE SOFTWARE REQUEST AND A GUEST MEMORY ADDRESS OF DATA TO    │
│ BE ACCESSED FOR EXECUTING THE SOFTWARE REQUEST 408                      │
└─────────────────────────────────────────────────────────────────────────┘
                                    ↓
┌─────────────────────────────────────────────────────────────────────────┐
│ TRANSMITTING, TO THE HOST IOMMU, A REQUEST COMPRISING THE SECOND PASID  │
│ TO IDENTIFY THE DATA IN THE DEVICE DATA BUFFER USING THE SECOND PASID AND│
│ A SECOND CORRESPONDING PAGE TABLE ENTRY                                 │
│ 410                                                                     │
└─────────────────────────────────────────────────────────────────────────┘
                                    ↓
┌─────────────────────────────────────────────────────────────────────────┐
│ RETRIEVING, FROM THE GUEST MEMORY, THE DATA                             │
│ 412                                                                     │
└─────────────────────────────────────────────────────────────────────────┘
```

EFFICIENT QUEUE SHADOWING FOR VIRTUAL MACHINES

TECHNICAL FIELD

The disclosure is generally related to virtualization systems, and is more specifically related to efficient queue shadowing for virtual machines.

BACKGROUND

Virtualization is a computing technique that improves system utilization, decoupling applications from the underlying hardware, and enhancing workload mobility and protection. Virtualization can abstract some physical components into logical objects in order to allow running various software modules, for example, multiple operating systems, concurrently and in isolation from other software modules, on one or more interconnected physical computer systems. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system can be referred to as a "host machine," and the operating system of the host machine can be referred to as the "host operating system." A virtual machine may function as a self-contained platform, executing its own "guest" operating system and software applications.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Implementations of the disclosure are directed to mechanisms for efficient peripheral device software request queue shadowing for virtual machines.

Various processor architectures support virtualization by providing instructions for facilitating virtual machine execution. In certain implementations, a processor can support executing a hypervisor (also referred to as "virtual machine monitor") that can act as a host and have complete control of various hardware resources of a host machine (also referred to as "host system") including the processor. A hypervisor can present a virtual machine with an abstraction of one or more virtual processors as well as other virtual devices. A hypervisor can retain selective control of processor resources, physical memory, interrupt management, input/output (I/O), and networking. Each virtual machine (VM) is a guest software environment that can support a stack that includes operating system (OS) and application software. Each VM can operate independently of other VMs and can use the same interface to the processors, memory, storage, graphics, and I/O provided by the physical platform (i.e., host machine). The software executing in a virtual machine can be executed at the reduced privilege level so that the hypervisor can retain control of platform resources.

Software operating as a layer above the hardware and below the virtual machines on the host machine can be referred to as a "hypervisor" (or a "virtual machine monitor") that can manage the execution of one or more virtual machines by providing a variety of functions such as virtualizing and allocating resources and context switching among virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization can be performed by having the hypervisor schedule time slots on one or more physical processors for a virtual machine without dedicating an entire physical processor exclusively to a single virtual machine. Memory virtualization can be achieved by utilizing a page table (PT) which is a data structure that can be used for translating virtual memory addresses to physical memory addresses or for translating guest memory addresses to host memory addresses. Device and input/output (I/O) virtualization can include managing the routing of I/O requests between virtual devices and the shared physical hardware.

Software processes running on a VM can make requests for peripheral input/output devices (peripheral I/O devices) perform various operations. Such a peripheral I/O device can be a physical or a virtual computer hardware device that respectively connects to a physical or a virtual computer system. In physical implementations, the peripheral device, such as a Peripheral Component Interconnect (PCI) device, can be coupled to a physical bus of the host machine. In virtual implementations, a hypervisor can abstract the peripheral device by assigning particular port ranges of the device to the virtual machine and presenting the assigned port ranges to the virtual machine as the virtual device. In some systems, the peripheral device can be capable of direct memory access (DMA) that allows the peripheral device to access the system memory for reading and/or writing independently of the central processing unit (CPU). Examples of such devices with DMA capabilities include disk drive controllers, graphics cards, network interface cards (NICs), sound cards, and other input/output (I/O) device.

The requests for peripheral devices to perform operations for the software processes can include accessing data that is stored in a memory buffer residing in the guest memory. These requests can each refer to an address (e.g., a guest virtual address (GVA) or a guest physical address (GPA)) in the guest memory where the data for executing the request can be located. Therefore, many systems implement an input/output memory management unit (IOMMU) to facilitate communication between a peripheral device and a VM and to manage the peripheral device access to the VM's guest memory and other memory resources of the host system. The IOMMU can be hardware memory management unit (MMU) that resides on the input/output (I/O) path connecting the peripheral device to the memory of the host system. The IOMMU can map the device address space (e.g., a bus address) associated with the I/O bus into the physical address space (e.g., host physical address) that is associated with the memory bus. The IOMMU can include one or more page tables, each of which can include a set of page table entries, such that each page table entry translates a one memory address to another. For example, a page table entry can translate (a) a guest physical address of a guest memory page to a host physical address of the host memory page, (b) a virtual memory address to a physical memory address, (c) a host memory address to a guest memory address, etc. The IOMMU can also utilize information associated with the address space mapping such as read and write permissions.

The software requests that are made by processes running on a VM can be stored in request queues. A request queue can be an ordered sequence (e.g., a chronologically ordered sequence) of requests generated by a software process of the guest VM to be executed or performed by the peripheral device and such queues can be referred to as software request queues. Accordingly, each request in the request queue can reference a particular guest memory location (e.g., a guest memory address in a dedicated buffer of the guest memory) where the data that is to be accessed by the peripheral device to execute the request is stored.

These guest memory locations storing the data accessible by the peripheral device to execute the software requests can be referred to as device data buffers in this disclosure. In some systems, the device data buffer can be defined by a memory address range in the memory space allocated by the VM for storing the data that is to be accessed by the peripheral device. For example, the device data buffer can be accessed, and data can be retrieved from it in response to an access request being made by a peripheral device either through DMA or through page table translation of an address performed by an IOMMU.

During the runtime of a virtual machine, the hypervisor can intercept I/O communications (e.g., memory access requests, interrupt requests, etc.) from a peripheral device and handle each I/O communication by forwarding the communication to the appropriate physical device on the host machine (e.g., the underlying I/O device, a memory device of the host machine, etc.). In some cases, the hypervisor can intercept a guest memory access request from the peripheral device, forward it to a host system IOMMU for translation (e.g., guest memory address to host memory address translation), and can provide host memory access using the translated memory access request. In other cases, the hypervisor can intercept an interrupt request from the peripheral device, translate the interrupt request via the host system IOMMU, and provide the event associated with the interrupt request to the virtual machine.

Thus, when software processes running on a VM make requests for peripheral devices to perform some operations that entail accessing data stored in guest memory (e.g., a device data buffer), these requests can be stored in a software request queue that can also be stored in guest memory. To identify and locate the data that is to be used for the execution of the request, each request can refer to an address (e.g., GPA, GVA) in guest memory at which the data for executing the request resides. In various systems (e.g., systems that include DMA-capable peripheral devices), it can be undesirable to allow unmediated access or direct communication between a VM and a host system resource such as a peripheral device because this can lead to security risks, collisions (i.e., contradictory instructions or read/write comments), conflicts in memory address changes, and other dilatory effects.

Thus, in order to prevent the guest VM from accessing the host physical memory directly and to permit a hypervisor to control and monitor memory operations performed by the peripheral device, a host memory location (referred to as a "shadow memory buffer" or as "shadow memory") that is inaccessible to the VM (e.g., accessible by host or hypervisor) can be allocated to store a copy of the software request queue (the copy referred to as a "shadow software queue" or "shadow queue"). Accordingly, a request queue stored in guest memory can be copied as a shadow request queue into another memory location (e.g., a shadow memory buffer) that can be accessible by the host (e.g., via the hypervisor) while not being accessible to the guest VM.

In this manner, the software requests can be accessed in the shadow software queue without accessing the software queue in the VM's guest memory to do so.

Notably, during the process of copying the request queue to the shadow queue, just as the address of the queue is translated from a location in guest memory (e.g., from a range of GPAs or GVAs) to a location in host memory (i.e., a range of HPAs or HVAs) the addresses (i.e., addresses identifying the relevant data locations) in each of the requests are also translated from guest addresses to host addresses to avoid or reduce the chances of the aforementioned collisions and conflicts caused by inadvertent accesses of guest memory locations. However, these translations become cumbersome and problematic since they need to be reversed whenever (i) a peripheral device requests to access the data, (ii) changes are to be made to the software request queue, and (iii) changes are to be made to the data in the buffer since consistency is maintained between the software request queue in the guest memory location and the shadow software request queue in the shadow memory buffer within the host memory location. Often, this translation occurs on the page level (i.e., page-level translation) and can be done by software running on the hypervisor. Moreover, with more requests being added to such queues and more operations being performed by peripheral devices to execute the requests, the overhead (i.e., time, energy, and processing resource consumption) used by the system increases and decreases the speed and resources for the remaining functions of the system.

Aspects of the present disclosure address the above-noted and other deficiencies by providing mechanisms that improve the accessibility of data by peripheral devices through efficient use of shadow queues. The various implementations of this disclosure enable a peripheral device assigned to a VM running on a host system to forego recurring translations (e.g., via the IOMMU) from host addresses to guest addresses and vice versa when retrieving software requests and accessing the data stored in the device data buffer to execute the requests. Such recurring translations can be avoided in implementations of the present disclosure by assigning one or more process address space identifiers (PASIDs) to the peripheral device for use when performing a corresponding action involving the referencing of a host memory address or a guest memory address.

The term "PASID" refers to an identifier that can be assigned to a process or set of operations (e.g., a process involving an interaction between a peripheral device and a memory resource such as when a peripheral device receives a software request from a software process or when the peripheral device access data on a machine), that enables the set of operations to have its own address range (i.e., that associates the process with a particular virtual address range). For example, the PASID can be implemented as an n-bit addition to entries in memory page tables (e.g., page tables used by the IOMMU to translate GVAs or GPAs to HPAs). The various implementations of the present disclosure can include assigning one or more different PASIDs to the peripheral device for use when obtaining the software requests and for use when accessing the data for executing the software requests.

For example, in some implementations a peripheral device can use one PASID (e.g., PASID1) to obtain the software requests from the shadow software queue located in the shadow memory buffer of the host and use a different PASID (e.g., PASID2) or not use a PASID to access the data in the device data buffer in guest memory to execute the requests. In such examples, for the peripheral device to retrieve a software request, the IOMMU can use the PASID1 and the corresponding page table entry to which it is appended to determine the host memory address (e.g., virtual memory address range) at which the shadow software request queue resides. In this manner, the software request can be obtained by the peripheral device without performing any translation between host memory addresses and guest memory addresses. With the host memory address of the software request from the shadow software queue having been identified by the IOMMU, the peripheral device can retrieve it and proceed to execute it. Analogously, for the peripheral device to access the data used for executing the software request, the IOMMU can use the PASID2 and the corresponding page table entry to which it is appended to determine the guest memory address (e.g., virtual memory address range, physical memory address range) at which the data resides in the device data buffer of the guest memory. Similarly, the data for executing the software request can be obtained from the device data buffer by the peripheral device without performing any translation between host memory addresses and guest memory addresses. With the guest memory address of the data from the device data buffer having been identified by the IOMMU, the peripheral device can retrieve it and proceed to execute the software request using the retrieved data.

Accordingly, in some implementations, one PASID can be assigned to the peripheral device for use when retrieving the software requests from the shadow queue. The PASID can be associated with (e.g., added to) page table entries that map host virtual addresses of the software requests to host physical addresses of the software requests in the shadow software queue. Thus, the IOMMU can then use that PASID together with the corresponding page table entry for a given host virtual address to identify the memory location (i.e., host physical address) of the software request for the peripheral device to retrieve it from the shadow memory buffer. A different PASID or no PASID (e.g., a null value) can be assigned for the peripheral device to use for accessing the data in the device data buffer in the guest memory to execute the requests. For example, the IOMMU can use a page table entry that isn't associated with any PASID or the IOMMU can use the different PASID together with the corresponding page table entry for a given guest address (e.g., a guest virtual address or address range referenced by the software request) to identify the memory location (e.g., guest physical address or address range) of the data in the device data buffer in the guest memory.

Thus, in some examples, by using PASID1, the IOMMU can identify (e.g., in a page table entry associated with PASID1) the memory address of the shadow software request queue in the host memory location and provide one or more requests from the shadow software request queue to the peripheral device without translating any guest addresses from the queue to host addresses or vice versa. Similarly, in these and other examples by using PASID2 (or no PASID), the IOMMU can identify (in a page table entry associated with PASID2 or in a page table entry that is not associated with any PASID) the memory address of the data in the device data buffer in the guest memory and provide it to the peripheral device to complete the execution of the request.

Various aspects of the above referenced methods and systems are described in detail herein below by way of examples, rather than by way of limitation. The examples provided below discuss a virtualized computer system where managing efficient peripheral device software request queue shadowing for VM data retrieval may be performed by aspects of a hypervisor, by a host operating system, by a virtual machine, or by a combination thereof. In other examples, managing peripheral device software request queue shadowing for VM data retrieval may be performed in computer system that is absent a hypervisor or other virtualization features discussed below. These and other benefits of the implementations of the present disclosure can be understood in more detail with reference to FIG. 1.

Figure 1:
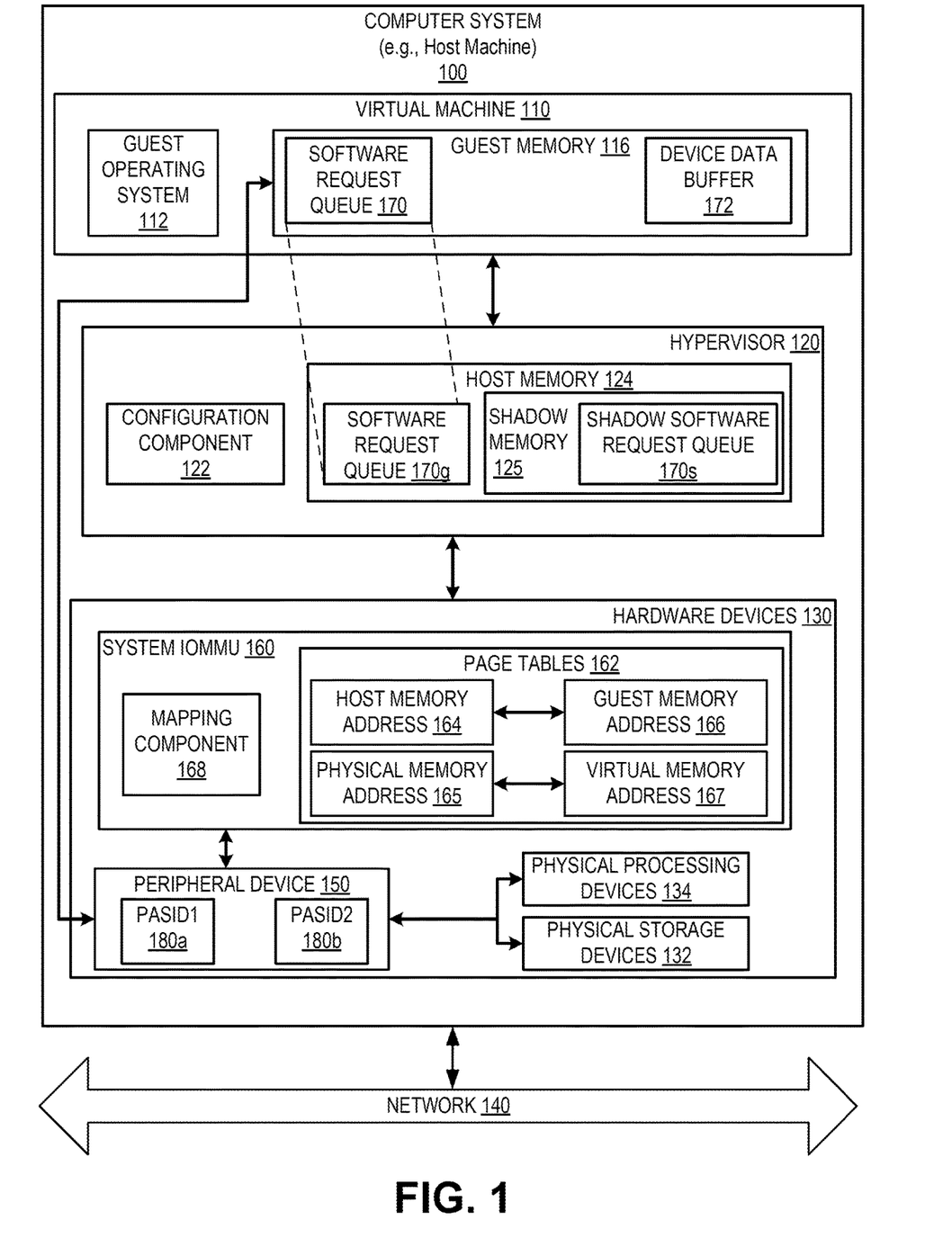
FIG. 1 depicts a high-level diagram of an example computer system that performs efficient peripheral device software request queue shadowing for virtual machines in accordance with one or more implementations of the present disclosure.

FIG. 1 depicts an illustrative architecture of elements of a computer system 100, in accordance with an implementation of the present disclosure. It should be noted that other architectures for computer system 100 are possible, and that the implementation of a computer system utilizing embodiments of the disclosure are not necessarily limited to the specific architecture depicted. Computer system 100 can be a single host machine or multiple host machines that may be arranged in a homogenous or non-homogenous group (e.g., cluster system, grid system, or distributed system). Computer system 100 can include a rackmount server, a workstation, a desktop computer, a notebook computer, a tablet computer, a mobile phone, a palm-sized computing device, a personal digital assistant (PDA), etc. In the implementation depicted in FIG. 1, computer system 100 can include hypervisor 120, one or more virtual machine(s) 110 hardware devices 130 including peripheral device (e.g., a PCI device) 150, and network 140.

Virtual machine 110 can execute guest executable code that uses an underlying emulation of the physical resources. The guest executable code can include a guest operating system 112, guest applications (e.g., software processes), guest device drivers, etc. Virtual machine(s) 110 can support hardware emulation, full virtualization, para-virtualization, operating system-level virtualization, and a combination thereof. Virtual machine(s) 110 can have the same or different types of guest operating systems 112. Virtual machine 110 can execute guest operating system 112 that manages guest memory 116.

Guest memory 116 can be any virtual memory, logical memory, physical memory, other portion of memory, or a combination thereof for storing, organizing, or accessing data. Guest memory 116 can represent the portion of memory that is allocated by hypervisor 120 for use by the virtual machine 110. Guest memory 116 can be managed by guest operating system 112 and can be divided into guest memory pages. In some implementations, guest memory 116 can include locations (i.e., address ranges) dedicated to storing specific types of data (e.g., software requests, data for executing software requests). For example, guest memory 116 can include the software request queue 170 made up of one or more requests generated by a software process of the VM 110. In the same or other implementations, the guest memory 116 can include a device data buffer 172 within which data used for executing software requests can reside.

Each of the guest memory pages can include a contiguous or non-contiguous sequence of bytes or bits and can have a page size that is the same or that is different from the memory page size used by the hypervisor 120. Each of the guest memory page sizes can be a fixed-size, such as a particular integer value (e.g., 4 KB, 2 MB) or can be a variable-size N that varies within a range of integer values (e.g., 4<KBCN<2 MB). In some cases, the guest memory pages can be memory blocks of a volatile or a non-volatile memory device and can each correspond respectively to an individual memory block, multiple memory blocks, or a portion of a memory block.

Host memory 124 (e.g., hypervisor memory) can be the same or similar to the guest memory. In some implementations, host memory 124 can be managed by hypervisor 120 instead of the guest operating system 112. Host memory 124 can include host pages, the state of each of which can be different. For example, the host pages can each be in a particular state including an unallocated memory state, a state of being allocated to guests, and a state of being allocated to a hypervisor 120. The unallocated memory can be host memory pages that have not yet been allocated or that were previously allocated by hypervisor 120 and have since been deallocated (e.g., freed) by hypervisor 120. The memory allocated to guests can be a portion of host memory 124 that has been allocated by hypervisor 120 to virtual machine 110 and can correspond to guest memory 116. For example, host memory 124 can include the guest memory 116 and the software request queue 170g.

Other portions of host memory 124 can be allocated for use by hypervisor 120, a host operating system, hardware device, other module, or a combination thereof. These other portions of host memory 124 can be exclusively accessible by the hypervisor 120 or the host system 100 and can be configured to be inaccessible to the guest VM 110. In some implementations, host memory 124 can include a shadow memory buffer 125 that is inaccessible to VM 110. The shadow memory buffer 125 can include a shadow software request queue 170s. In the same or other implementations, the hypervisor 120 can duplicate, copy, or remap software request queue 170 of the guest memory 116 to the shadow software request queue 170s and maintain consistency between them such that the same software requests are present in each queue.

Hypervisor 120 can also be referred to as a virtual machine monitor (VMM) and can provide virtual machine 110 with access to one or more features of the underlying hardware devices 130. In the depicted implementations, hypervisor 120 can run directly on the hardware of computer system 100 (e.g., bare metal hypervisor). In other examples, hypervisor 120 can run on or within a host operating system (not shown). Hypervisor 120 can manage system resources, including access to hardware devices 130. In the example shown, hypervisor 120 can include a configuration component 122 and host memory 124.

Configuration component 122 can execute configuration operations on the host system IOMMU 160 (also referred to as "host IOMMU") and the peripheral device 150. In some implementations, configuration component 122 can allocate memory to VM 110, configure host memory 124, and configure memory access restrictions. In some examples, configuration component 122 can set permissions and access parameters to permit peripheral device 150 to access guest memory 116 and host memory 124. For example, the configuration component 122 of the hypervisor 120 can assign one or more PASIDs 180a, 180b to the peripheral device 150 for use when performing operations that involve accessing the host memory 124 and accessing the guest memory 124, respectively. In the same or other implementations, configuration component 122 can configure the system IOMMU 160 to translate memory access requests associated with the virtual machine 110 and the peripheral device 150 and to store the translations in IOMMU page tables 162.

System IOMMU 160 can manage address translations in response to receiving memory access requests, interrupt requests, or any other data requests and/or commands. System IOMMU 160 can include page table(s) 162 and mapping component 168. Page table(s) 162 can each be a data structure used to store (e.g., as one or more page table entries) a mapping of one memory address type to another memory address type (e.g., addresses of the guest memory 116 to addresses of the host memory 124, physical addresses to virtual addresses, etc.). In some implementations, page tables 162 can include page table entries respectively associated with a corresponding PASID (e.g., PASID1 180a or PASID2 180b) assigned by the configuration component 122 or the mapping component 168. In other implementations, page tables 162 can include page table entries that are not associated with any PASID.

Accordingly, address translation or identification can be managed using the page table(s). For example, page table(s) 162 can be used by the system IOMMU 160 to identify the physical address 165 mapped (i.e., corresponding) to a virtual memory address 167. In another example, page table(s) 162 can be used by the system IOMMU 160 to identify the guest physical addresses 166 of guest memory 116 pages that is mapped to a corresponding host physical addresses 164 of host memory 124. Page table 162 can include one or more page tables such as a protected page table or an unprotected page table. In some implementations, the host page table(s) 162 can be extended page tables (EPTs) mapping guest physical addresses to host physical addresses. In the same or other implementations, the page tables 162 can be the shadow page tables mapping the guest virtual addresses to host physical addresses. In some implementations, page table(s) 162 can be the hypervisor page tables, mapping the guest physical addresses to hypervisor virtual addresses.

Hardware devices 130 can provide hardware resources and functionality for performing computing tasks. Hardware devices 130 can include one or more physical storage devices 132, one or more physical processing devices 134, system IOMMU 160, other computing devices, or a combination thereof. One or more of hardware devices 130 can be split up into multiple separate devices or consolidated into one or more hardware devices. Some of the hardware device shown can be absent from hardware devices 130 and can instead be partially or completely emulated by executable code.

Physical storage devices 132 can include any data storage device that is capable of storing digital data and can include volatile or non-volatile data storage. Volatile data storage (e.g., non-persistent storage) can store data for any duration of time but can lose the data after a power cycle or loss of power. Non-volatile data storage (e.g., persistent storage) can store data for any duration of time and can retain the data beyond a power cycle or loss of power. In one example, physical storage devices 132 can be physical memory and can include volatile memory devices (e.g., random access memory (RAM)), non-volatile memory devices (e.g., flash memory, NVRAM), and/or other types of memory devices. In another example, physical storage devices 132 can include one or more mass storage devices, such as hard drives, solid state drives (SSD)), other data storage devices, or a combination thereof. In a further example, physical storage devices 132 can include a combination of one or more memory devices, one or more mass storage devices, other data storage devices, or a combination thereof, which can be arranged in a cache hierarchy with multiple levels.

Physical processing devices 134 can include one or more processors that are capable of executing the computing tasks. Physical processing devices 134 can be a single core processor that is capable of executing one instruction at a time (e.g., single pipeline of instructions) or can be a multi-core processor that simultaneously executes multiple instructions. The instructions can encode arithmetic, logical, or I/O operations. In one example, physical processing devices 134 can be implemented as a single integrated circuit, two or more integrated circuits, or can be a component of a multi-chip module (e.g., in which individual microprocessor dies are included in a single integrated circuit package and hence share a single socket). A physical processing device can also be referred to as a central processing unit ("CPU").

Network 140 can be a public network (e.g., the internet), a private network (e.g., a local area network (LAN), a wide area network (WAN)), or a combination thereof. In some implementations, network 140 can include a wired or a wireless infrastructure, which can be provided by one or more wireless communications systems, such as a wireless fidelity (Wi-Fi) hotspot connected with the network 140 and/or a wireless carrier system that can be implemented using various data processing equipment, communication towers, etc.

Peripheral device 150 can be a computer hardware device that plugs directly into a corresponding physical slot of the computer system 100 (e.g., a PCI device that plugs into a PCI slot of the computer system 100). In some embodiments, peripheral device 150 can be assigned to the guest operating system 112 of the virtual machine 110 and can communicate with the guest operating system 112. Peripheral device 150 can include DMA (direct memory access) capabilities, which allow peripheral device 150 to access system memory (e.g., physical storage devices 132) for performing memory access operations (i.e., reading and/or writing) independently of a system CPU (e.g., physical processing devices 134). For example, the peripheral device 150 can transfer its input/output (I/O) data directly to and from physical storage devices 132. The peripheral device 150 can include on-device IOMMU 152 to manage address translations, and memory management component 162.

In some implementations, the host computer system 100 can cause the hypervisor 120 to create and run a VM 110. The hypervisor 120 can assign a peripheral device to the VM 110. For example, the configuration component 122 can configure the peripheral device 150 such that it is associated with and permitted to communicate with the VM 110. In the same or other implementations, the host computer system 100 (e.g., via configuration component 122) can assign, to the peripheral device 150, a process address space identifier (PASID) 180*a* that is associated with the shadow memory buffer 125 in a host memory 124 of the host computer system 100. For example, the computer system 100 can cause the configuration component 122 to configure the peripheral device 150 such that the peripheral device uses the PASID 180*a* to access host memory 124.

In some implementations, the host computer system 100 can assign (e.g., via configuration component 122), to the peripheral device, another PASID 180*b* that is associated with the device data buffer 172 in the guest memory 116 of the VM. Additionally, the host computer system 100 can cause the host input/output memory management unit (IOMMU) of the host computer system 160 to use the first PASID 180*a* and a corresponding page table 162 entry to identify a software request in the shadow memory buffer 125. For example, the host computer system 100 can cause the IOMMU to identify a software request in the shadow software request queue 170*s* based on an address translation in a page table entry associated with the initially assigned PASID 180*a*. That is, because the IOMMU is located in the memory access path, when the peripheral device attempts to access a memory location (e.g., a host memory, a guest memory, etc.) the memory access request is routed to the IOMMU which can reference one or more page tables to determine the memory address to which the request is to be directed. In the various implementations, the host computer system 100 can retrieve, from the shadow memory buffer 125 of the host memory 124, the software request as well as a guest memory address of the data that is requested to be accessed by the software request.

Accordingly, responsive to receiving a peripheral device request originated by the peripheral device ewdddd to access the data for executing the software request, the host computer system 100 can cause the host IOMMU 160 to use the other PASID 180*b* and another corresponding page table 162 entry to identify the data in the device data buffer 172. The host computer system 100 can then transmit the data, from the guest memory 116 (e.g., from the device data buffer 172) to the peripheral device 172. In the various implementations, each of the first page table entry and the second page table entry are can be stored in different respective page tables 162.

In some implementations, to reduce the frequency of translating host addresses to guest addresses of the software request queue, the host computer system 100 can copy one or more software requests from a software request queue 170 of the guest memory 116 of the VM to a shadow software request queue 170*s* in the shadow memory buffer 125 of the host memory 124 of the host computer system. Having created a shadow software request queue 170*s*, the host computer system 100 can (e.g., via hypervisor 120 and/or VM 110) continuously (e.g., periodically with a predetermined frequency, or in response to triggering events such as notifications about requests) monitor the software request queue 170 (e.g., monitor the request queue 170 and/or the shadow request queue 170*s* for any changes). In response to a modification being made in the software request queue 170, the host computer system 100 can perform a corresponding modification to the shadow software request queue 170*s*. Analogously, response to a modification being made in the shadow software request queue 170*s*, the host computer system 100 can perform a corresponding modification to the software request queue 170.

In some implementations, to identify the software request, the host computer system 100 can (e.g., via the IOMMU 160) use the initially assigned PASID 180a and its corresponding page table 162 entry to translate a host virtual address (or a guest virtual address) of the software request in the software request queue 170g to a host physical address (or a host virtual address) of the software request in the shadow software request queue 170s. Notably, in these or other implementations the shadow memory buffer 125 can be inaccessible to the VM 110 while the device data buffer 172 can be accessible by the peripheral device 150 to retrieve the data for executing the software request. These and other features of the implementations of the present disclosure are described in more detail with reference to FIGS. 2-6.

Figure 2:
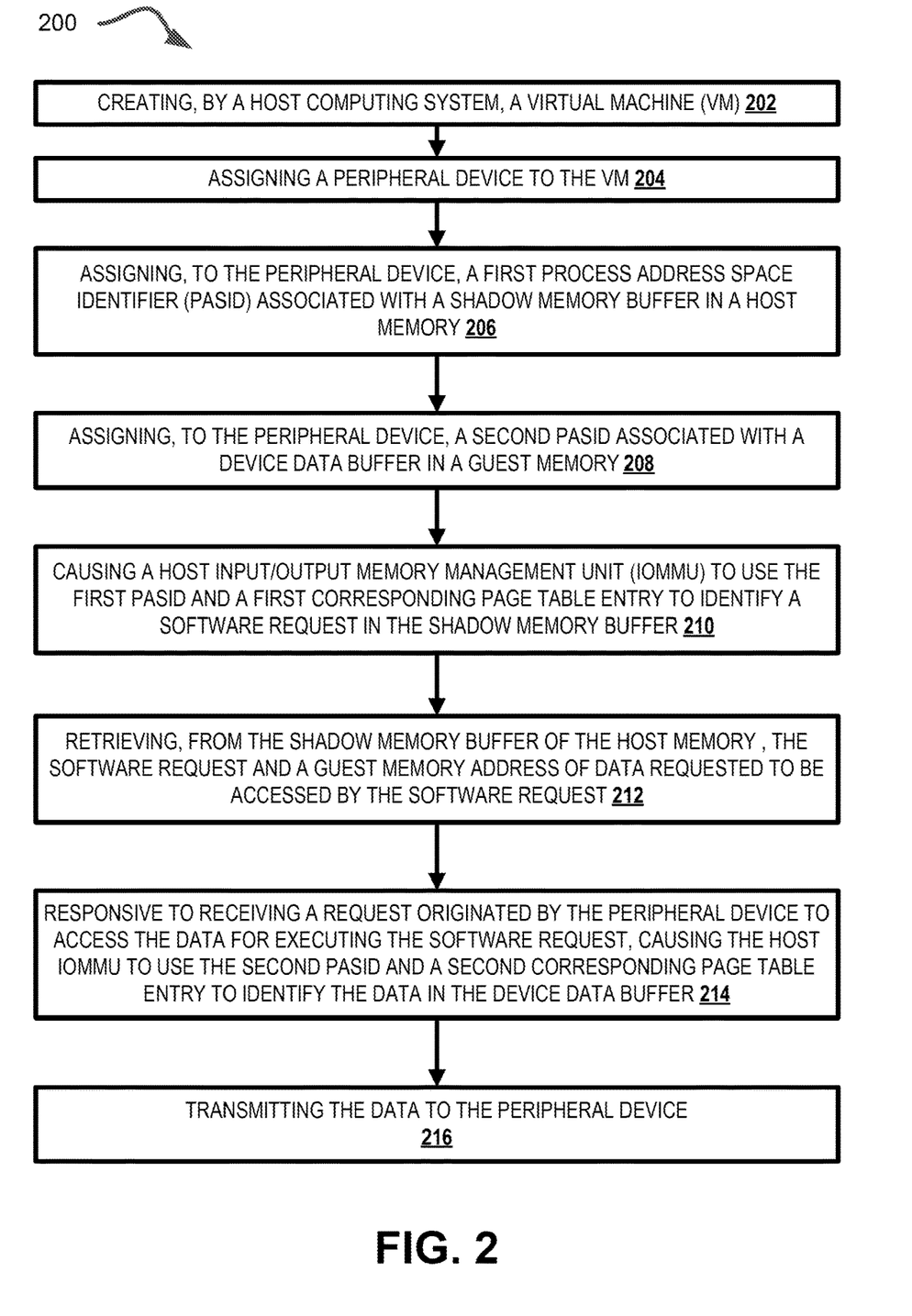
FIG. 2 is a flow diagram of an example method for efficient peripheral device software request queue shadowing for virtual machines in accordance with one or more implementations of the present disclosure.

FIG. 2 is a flow diagram of an example method 200 for efficient peripheral device software request queue shadowing for virtual machines in accordance with one or more implementations of the present disclosure. Method 200 can be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations can be performed by one or more processors of a computer system (e.g., the computer system 100 of FIG. 1) implementing the method. In some implementations, method 200 can be performed by the hypervisor 120 of FIG. 1. In an illustrative example, method 200 may be performed by a single processing thread. Alternatively, method 200 can be performed by two or more processing threads, each thread implementing one or more individual functions, routines, subroutines, or operations of the method. In an illustrative example, the processing threads implementing method 200 can be synchronized (e.g., using semaphores, critical sections, or other thread synchronization mechanisms). Alternatively, the processing threads implementing method 200 can be executed asynchronously with respect to each other. Therefore, while FIG. 2 and the associated description lists the operations of method 200 in certain order, various implementations of the method can perform at least some of the described operations in parallel or in arbitrary selected orders.

In some implementations, at block 202, the processing logic can create (e.g., by a hypervisor 120 of host computer system 100) one or more VMs to run on a host computer system. Further, at block 204, the processing logic can assign a peripheral device to each VM or some VMs. For example, at block 204 the processing logic can assign to the VM a PCI device accessible to software processes of the VM.

In some implementations, at block 206, the processing logic can assign, to the peripheral device, a process address space identifier (PASID). This PASID can be associated with a shadow memory buffer in a host memory location. For example, at block 206, the processing logic can assign, to the peripheral device, a PASID that is associated (e.g., by being appended to corresponding page table entries) with the address range corresponding to shadow memory buffer of the host memory where the shadow request queue is stored. In various implementations, at block 208, the processing logic can assign, to the peripheral device, a different PASID associated with a device data buffer in a guest memory location. For example, at block 206, the processing logic can assign, to the peripheral device, the PASID that is associated (e.g., by being appended to corresponding page table entries) with the address range corresponding to the device data buffer in guest memory where the data for executing software requests is stored.

In some implementations, at block 210 the processing logic can cause a host input/output memory management unit (IOMMU) to use one of the assigned PASIDs and a corresponding page table entry to identify a software request in the shadow memory buffer. For example, at block 210, the processing logic can cause the host IOMMU to use one of the assigned PASIDs and a corresponding page table entry to identify a software request in the shadow software queue residing in host memory. Consequently, at block 212, the processing logic can fetch, from the shadow memory buffer of the host memory location, the software request and a guest memory address of data requested to be accessed by the software request. For example, this can include providing one or more software requests stored at the identified host address(es) along with the respective guest memory address(es) of the data referenced by those software requests or used to execute those requests.

In some implementations, the processing logic can receive a request from a peripheral device to access the data so that the peripheral device can execute the software request. Accordingly, at block 214, the processing logic can, responsive to receiving a peripheral device request to access the data for executing the software request, cause the host IOMMU to use the other PASID (or no PASID) and a corresponding page table entry (i.e., a page table entry that is different than the one used with the previous PASID) to identify the data in the device data buffer. For example, at block 214, the processing logic can cause the host IOMMU to identify the guest memory address(es) corresponding to the guest memory location(s) where the data that can be used to execute the software requests resides within the device data buffer of the VM. In some implementations, having located and identified the data in the device data buffer the processing logic can, at block 216, transmit the data, from the guest memory to the peripheral device. For example, at block 216, the processing logic can transmit the data to the peripheral device from the device data buffer. Additional details regarding the features of the various implementation are provided below with reference to FIG. 3.

Figure 3:
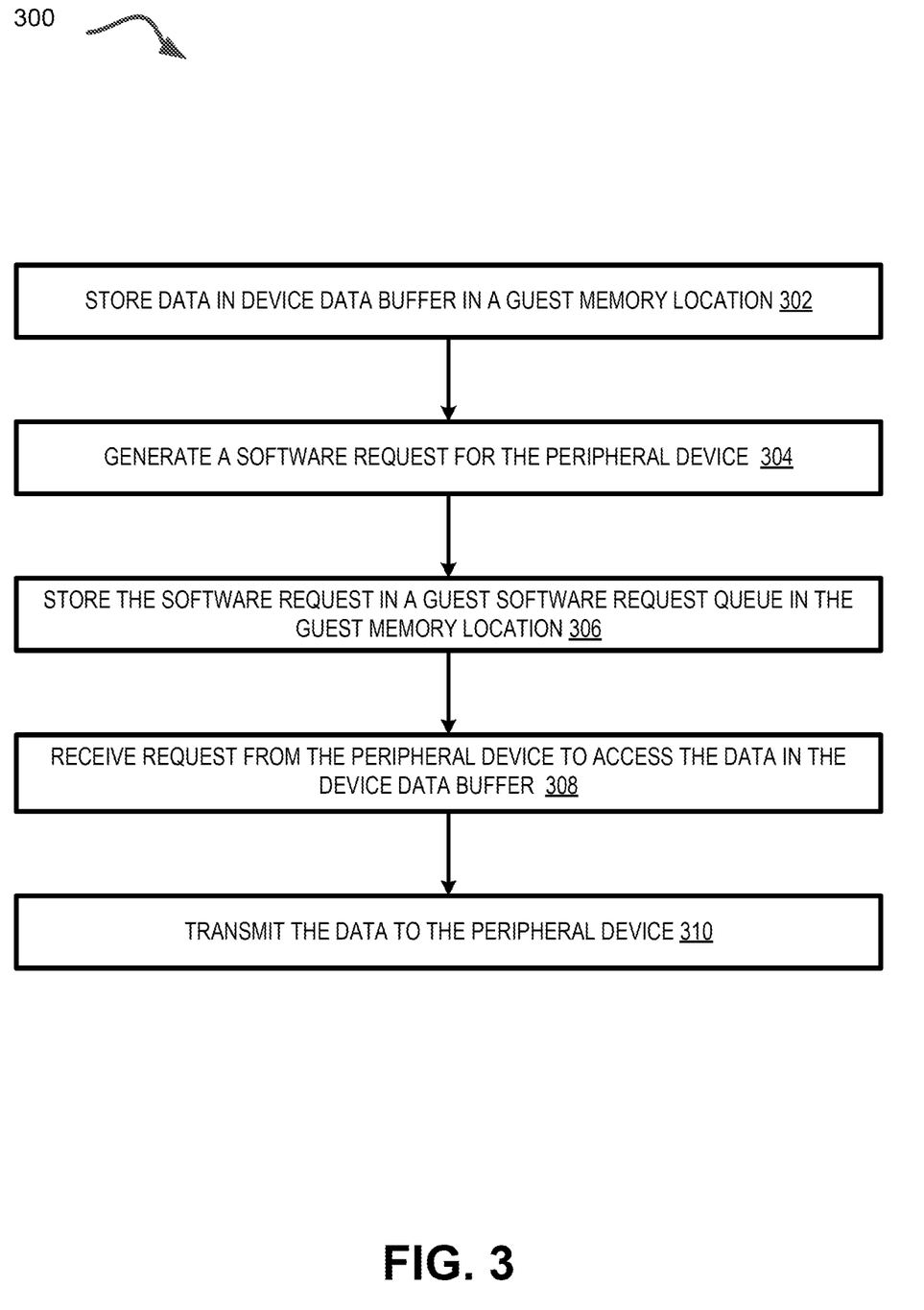
FIG. 3 is a flow diagram of an example method for providing data for executing software requests to a peripheral device in accordance with one or more implementations of the present disclosure.

FIG. 3 is a flow diagram of an example method 300 for providing data for executing software requests to a peripheral device in accordance with one or more implementations of the present disclosure. Method 300 can be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations can be performed by one or more processors of a computer system (e.g., the computer system 100 of FIG. 1) implementing the method. In some implementations, method 300 can be performed by the VM 110 of FIG. 1. In an illustrative example, method 300 can be performed by a single processing thread. Alternatively, method 300 can be performed by two or more processing threads, each thread implementing one or more individual functions, routines, subroutines, or operations of the method. In an illustrative example, the processing threads implementing method 300 can be synchronized (e.g., using semaphores, critical sections, or other thread synchronization mechanisms). Alternatively, the processing threads implementing method 300 can be executed asynchronously with respect to each other. Therefore, while FIG. 3 and the associated description lists the operations of method 300 in certain order, various implementations of the method can perform at least some of the described operations in parallel or in arbitrary selected orders.

Events and operations occurring within the various blocks of method 300 can occur, in some implementations, in any order as well as together with or instead of events and operations occurring within the various blocks of method 200 described earlier. At block 302, the processing logic (e.g., via the hypervisor 120 or the VM 110) can store data in device data buffer in a guest memory location. In some implementations, at block 304, the processing logic can generate a software request for the peripheral device. further, at block 306, the processing logic can store the software request in a guest software request queue in the guest memory location.

Then, in the same or other implementations, at block 308, the processing logic can receive request from the peripheral device to access the data in the device data buffer. For example, the processing logic can receive a peripheral device request to access the data in the device data buffer at the address(es) referenced by a software request so that the peripheral device can complete the execution of the software request. In some implementations, responsive to receiving the request from the peripheral device, the processing logic can transmit the data to the peripheral device, at block 310. For example, the processing logic can transmit the data requested by the peripheral device, from the device data buffer to the peripheral device. Additional features of the various implementations of the present disclosure are further described with reference to FIG. 4.

Figure 4:
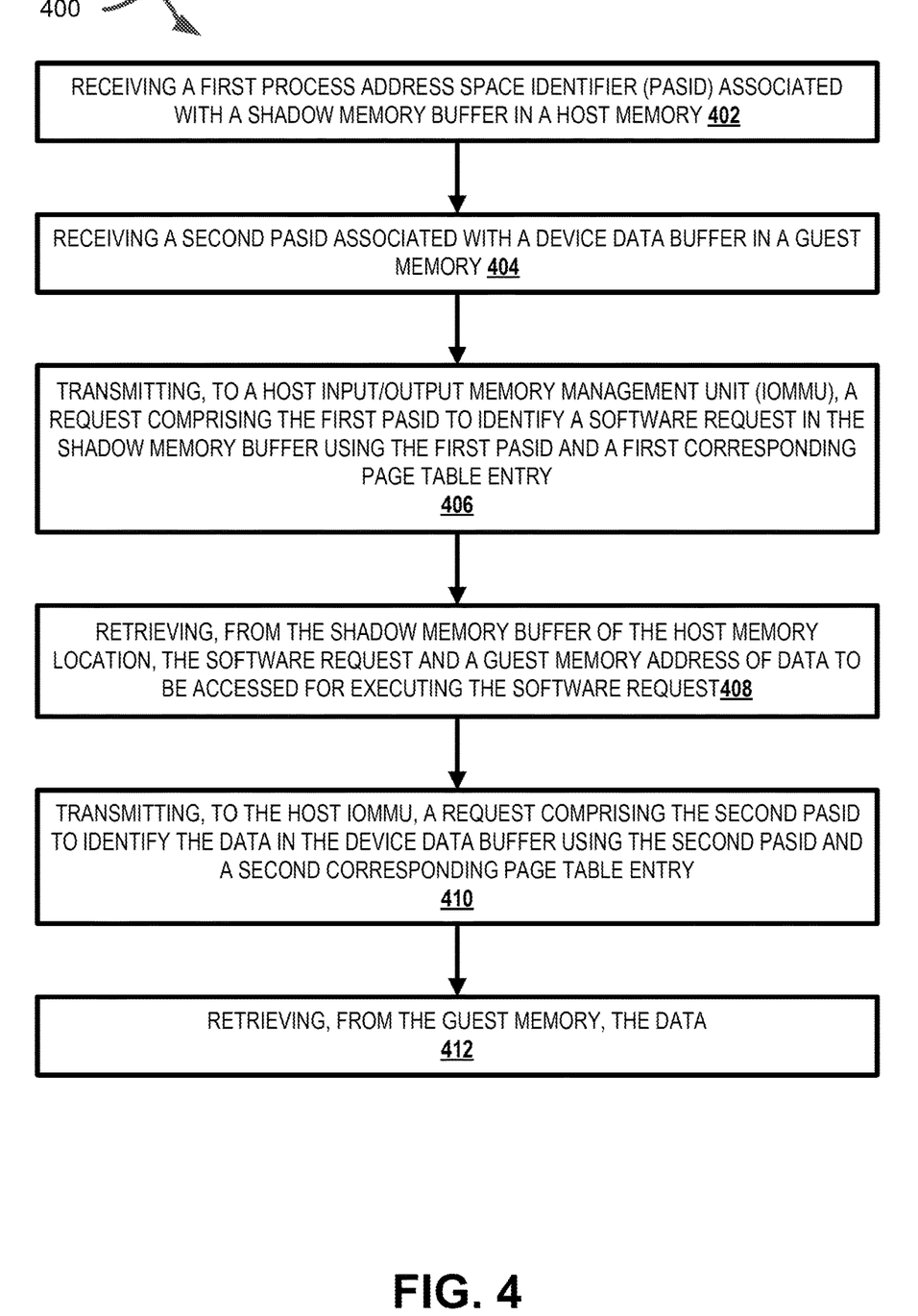
FIG. 4 is a flow diagram of an example method for using a shadow software request queue to retrieve data in accordance with one or more implementations of the present disclosure.

FIG. 4 is a flow diagram of an example method 400 for using a shadow software request queue to retrieve data in accordance with one or more implementations of the present disclosure. Method 400 can be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations can be performed by one or more processors of a computer system (e.g., the computer system 100 of FIG. 1) implementing the method. In some implementations, method 400 can be performed by the peripheral device 150 of FIG. 1. In an illustrative example, method 400 can be performed by a single processing thread. Alternatively, method 400 can be performed by two or more processing threads, each thread implementing one or more individual functions, routines, subroutines, or operations of the method. In an illustrative example, the processing threads implementing method 400 can be synchronized (e.g., using semaphores, critical sections, or other thread synchronization mechanisms). Alternatively, the processing threads implementing method 400 can be executed asynchronously with respect to each other. Therefore, while FIG. 4 and the associated description lists the operations of method 400 in certain order, various implementations of the method can perform at least some of the described operations in parallel or in arbitrary selected orders.

Events and operations occurring within the various blocks of method 400 can occur, in some implementations, in any order as well as together with or instead of events and operations occurring within the various blocks of methods 200 and 300 described earlier. At block 402, the processing logic (e.g., via the hypervisor or the peripheral device) can receiving a process address space identifier (PASID) associated with a shadow memory buffer in a host memory location. For example, the processing logic can receive the PASID from a configuration component of a hypervisor where the PASID is to be used for accessing host memory addresses.

In some implementations, at block 404, the processing logic can receive another PASID associated with a device data buffer in a guest memory location. For example, the processing logic can receive this other PASID from the configuration component of the hypervisor with an indication that the PASID is to be used for accessing guest memory addresses.

The processing logic can, at block 406, transmitting, to a host input/output memory management unit (IOMMU), a request that includes one of the PASIDs to identify a software request in the shadow memory buffer by using the PASID and a corresponding page table entry. For example, the processing logic can transmit, to the IOMMU, a request to identify a host memory address corresponding to a host virtual address associated with the PASID. In the same or other implementations, at block 408, the processing logic can retrieve, from the shadow memory buffer of the host memory location, the software request and a guest memory address of the data that is to be accessed for executing the software request.

The processing logic, at block 410, can then transmitting, to the host IOMMU, a request that includes another PASID to identify the data in the device data buffer by using this other PASID and another corresponding page table entry. Having identified the data for completing the execution of the software request, in the various implementations, at block 412, the processing logic can retrieve the data from the guest memory.

Figure 5:
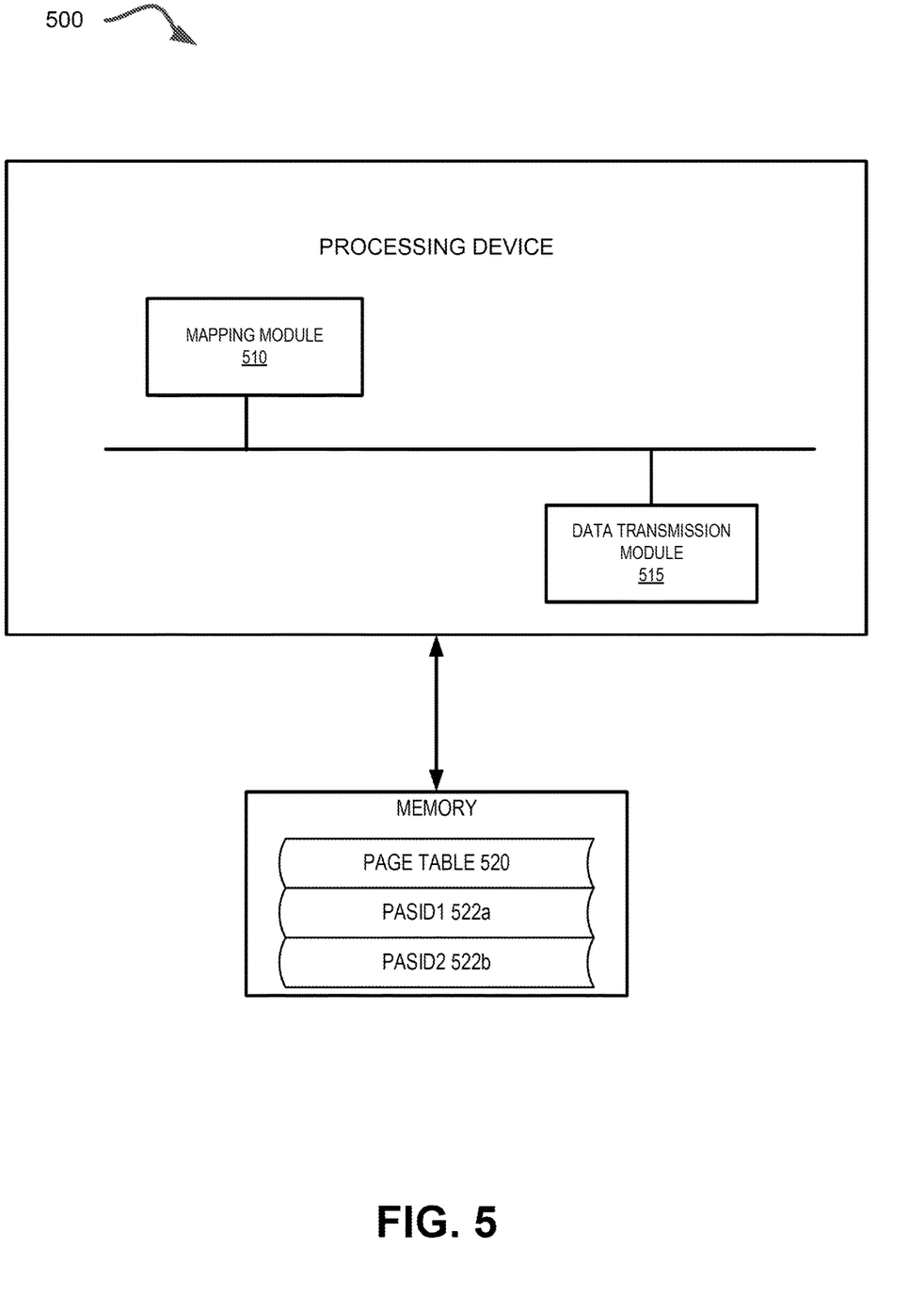
FIG. 5 depicts a block diagram of a computer system operating in accordance with one or more implementations of the present disclosure.

FIG. 5 depicts a block diagram of a computer system operating in accordance with one or more implementations of the present disclosure. Computer system 500 can be the same or similar to computer system 100 of FIG. 1 or computer system 600 of FIG. 6 and can include one or more processing devices and one or more memory devices. In the example shown, computer system 500 can include a mapping module 510, a data transmission 515, a memory, and data such as page tables 520, PASID1 522a, and PASID2 522b stored in the memory.

In some implementations, the mapping module 510 can enable the processing device (e.g., a processor) to map physical memory addresses to virtual memory addresses and guest memory addresses to host memory addresses to identify memory locations where requested data resides. The data transmission module 515 can enable the processor to receive and transmit requests for data and resources. In some implementations, the data transmission module 515 can enable the processor to generate software requests, store software requests in software request queues, copy and transmit software requests, as well as generate, store, and transmit data retrieval and memory access requests.

Figure 6:
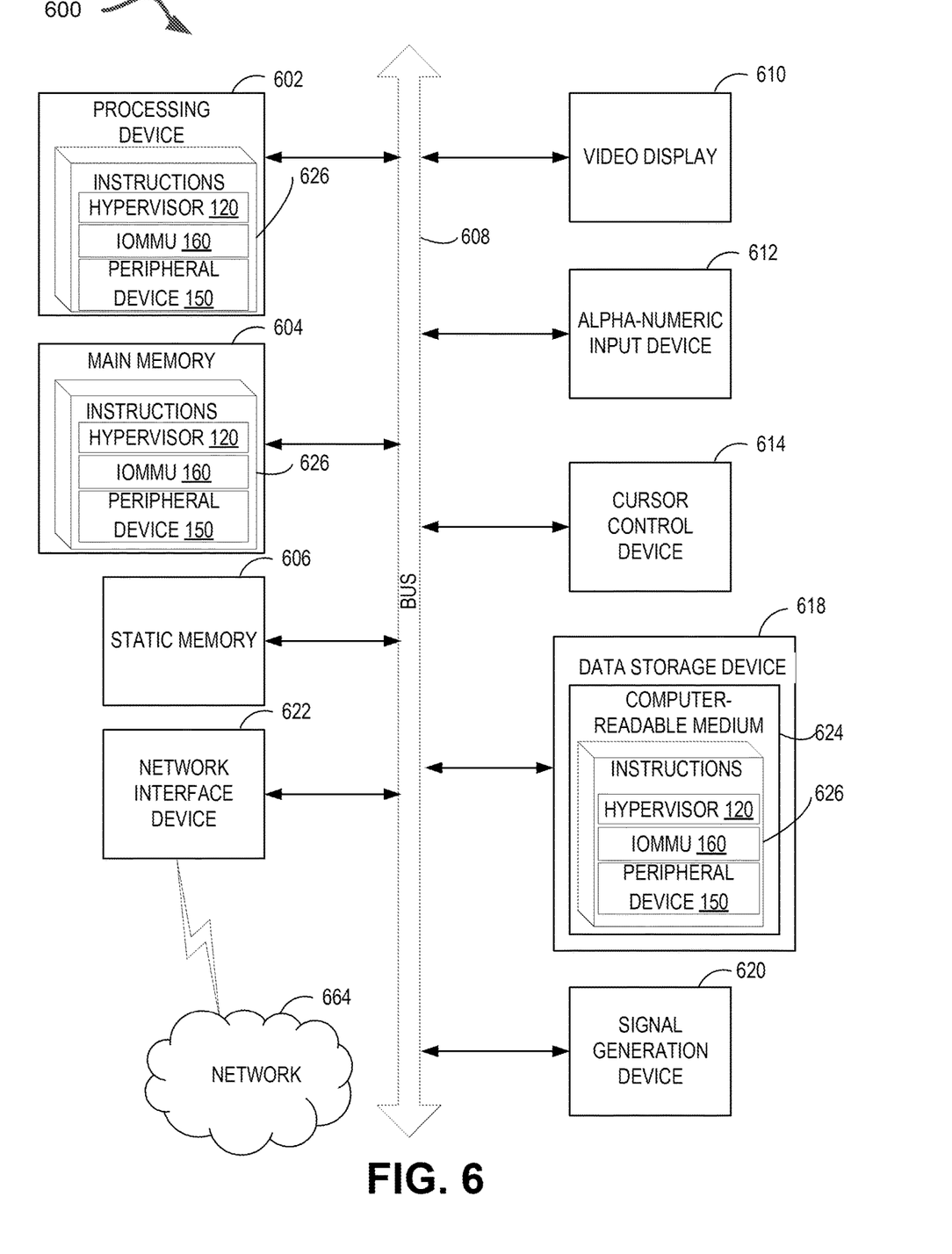
FIG. 6 depicts a block diagram of an illustrative computing device operating in accordance with one or more implementations of the present disclosure.

FIG. 6 depicts a block diagram of a computer system operating in accordance with one or more aspects of the disclosure. In various illustrative examples, computer system 600 can correspond to computer system 100 of FIG. 1. The computer system 600 can be included within a data center that supports virtualization. Virtualization within a data center results in a physical system being virtualized using VMs and/or containerized applications to consolidate the data center infrastructure and increase operational efficiencies. A VM can be a program-based emulation of computer hardware. For example, the VM can operate based on computer architecture and functions of computer hardware resources associated with hard disks or other such memory. The VM can emulate a physical computing environment, but requests for a hard disk, memory, or networking resources can be managed by a virtualization layer of a host system to translate these requests to the underlying physical computing hardware resources. This type of virtualization results in multiple VMs sharing physical resources.

In certain implementations, computer system 600 can be connected (e.g., via a network, such as a Local Area Network (LAN), an intranet, an extranet, or the Internet) to other computer systems. Computer system 600 can operate in the capacity of a server or a client computer in a client-server environment, or as a peer computer in a peer-to-peer or distributed network environment. Computer system 600 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 can include a processing device 602, a volatile memory 604 (e.g., random access memory (RAM)), a non-volatile memory 606 (e.g., read-only memory (ROM) or electrically-erasable programmable ROM (EEPROM)), and a data storage device 618, which can communicate with each other via a bus 608.

Processing device 602 can be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 can further include a network interface device 608. Computer system 600 also can include a video display unit 610 (e.g., an LCD), an alphanumeric input device 612 (e.g., a keyboard), a cursor control device 614 (e.g., a mouse), and a signal generation device 616.

Data storage device 618 can include a non-transitory computer-readable storage medium 624 on which can store instructions 626 embodying any one or more of the methodologies or functions described herein (e.g., hypervisor 120, IOMMU 160, and peripheral device 160 of FIG. 1, and methods 200, 300, and 400 of FIGS. 2, 3, and 4, respectively). Instructions 626 can also reside, completely or partially, within volatile memory 604 and/or within processing device 602 during execution thereof by computer system 600, hence, volatile memory 604 and processing device 602 can also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods 200, and 300, and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    creating, by a host computer system, a virtual machine (VM);
    assigning a peripheral device to the VM;
    assigning, to the peripheral device, a first process address space identifier (PASID) associated with a shadow memory buffer in a host memory of the host computer system;
    assigning, to the peripheral device, a second PASID associated with a device data buffer in a guest memory of the VM;
    causing a host input/output memory management unit (IOMMU) of the host computer system to use the first PASID and a first corresponding page table entry to identify a software request in the shadow memory buffer;

retrieving, from the shadow memory buffer of the host memory, the software request and a guest memory address of data requested to be accessed by the software request;

responsive to receiving a request originated by the peripheral device to access the data for executing the software request, causing the host IOMMU to use the second PASID and a second corresponding page table entry to identify the data in the device data buffer; and transmitting the data to the peripheral device.

2. The method of claim 1, further comprising:

copying one or more software requests from a software request queue of the guest memory of the VM to a shadow software request queue in the shadow memory buffer of the host memory of the host computer system.

3. The method of claim 2, further comprising:

monitoring the software request queue; and responsive to a modification being made in the software request queue, performing a corresponding modification to the shadow software request queue.

4. The method of claim 1, wherein the software request references a guest memory address.

5. The method of claim 1, wherein identifying the software request further comprises: using the first PASID and the first page table entry to translate a host virtual address of the software request in the software request queue to a host physical address of the software request in the shadow software request queue.

6. The method of claim 1, wherein the shadow memory buffer is inaccessible by the VM and wherein the device data buffer is accessible by the peripheral device to retrieve the data for executing the software request.

7. The method of claim 1, wherein each of the first page table entry and the second page table entry are stored in different respective page tables.

8. A system comprising:

a memory device;

a processing device operatively coupled to the memory device, to perform operations comprising:

creating, by the system, a virtual machine (VM);

assigning a peripheral device to the VM;

assigning, to the peripheral device, a first process address space identifier (PASID) associated with a shadow memory buffer in a host memory of the system;

assigning, to the peripheral device, a second PASID associated with a device data buffer in a guest memory of the VM;

causing a host input/output memory management unit (IOMMU) of the system to use the first PASID and a first corresponding page table entry to identify a software request in the shadow memory buffer;

retrieving, from the shadow memory buffer of the host memory, the software request and a guest memory address of data requested to be accessed by the software request;

responsive to receiving a request originated by the peripheral device to access the data for executing the software request, causing the host IOMMU to use the second PASID and a second corresponding page table entry to identify the data in the device data buffer; and transmitting the data to the peripheral device.

9. The system of claim 8, wherein the operations further comprise:

copying one or more software requests from a software request queue of the guest memory of the VM to a shadow software request queue in the shadow memory buffer of the host memory of the host computer system.

10. The system of claim 9, further comprising:

monitoring the software request queue; and responsive to a modification being made in the software request queue, performing a corresponding modification to the shadow software request queue.

11. The system of claim 8, wherein the software request references a guest memory address.

12. The system of claim 8, wherein identifying the software request further comprises using the first PASID and the first page table entry to translate a host virtual address of the software request in the software request queue to a host physical address of the software request in the shadow software request queue.

13. The system of claim 8, wherein the shadow memory buffer is inaccessible by the VM and wherein the device data buffer is accessible by the peripheral device to retrieve the data for executing the software request.

14. The system of claim 8, wherein each of the first page table entry and the second page table entry are stored in different respective page tables.

15. A non-transitory computer-readable media storing instructions that, when executed, cause a processing device to perform operations comprising:

creating, by a host computer system, a virtual machine (VM);

assigning a peripheral device to the VM;

assigning, to the peripheral device, a process address space identifier (PASID) associated with a shadow memory buffer in a host memory of the host computer system;

causing a host input/output memory management unit (IOMMU) of the host computer system to use the PASID and a first corresponding page table entry to identify a software request in the shadow memory buffer;

retrieving, from the shadow memory buffer of the host memory, the software request and a guest memory address of data requested to be accessed by the software request;

responsive to receiving a request originated by the peripheral device to access the data for executing the software request, causing the host IOMMU to use a second corresponding page table entry to identify the data in a device data buffer in a guest memory location; and transmitting the data to the peripheral device.

16. The non-transitory computer-readable media of claim 15, wherein the instructions further cause the processing device to perform operations comprising:

copying one or more software requests from a software request queue of the guest memory of the VM to a shadow software request queue in the shadow memory buffer of the host memory of the host computer system.

17. The non-transitory computer-readable media of claim 16, wherein the instructions further cause the processing device to perform operations comprising:

monitoring the software request queue; and responsive to a modification being made in the software request queue, performing a corresponding modification to the shadow software request queue.

18. The non-transitory computer-readable media of claim 15, wherein the software request references a guest memory address.

19. The non-transitory computer-readable media of claim 15, wherein identifying the software request further comprises: using the PASID and the first page table entry to translate a host virtual address of the software request in the software request queue to a host physical address of the software request in the shadow software request queue.

20. The non-transitory computer-readable media of claim 15, wherein the shadow memory buffer is inaccessible by the VM and wherein the device data buffer is accessible by the peripheral device to retrieve the data for executing the software request.

\* \* \* \* \*